(12) United States Patent

Ortega et al.

(10) Patent No.: US 6,345,249 B1
(45) Date of Patent: Feb. 5, 2002

(54) AUTOMATIC ANALYSIS OF A SPEECH DICTATED DOCUMENT

(75) Inventors: Kerry A. Ortega, Raleigh, NC (US); Kris A. Coe, Lighthouse Point; Steven J. Friedland, Boca Raton, both of FL (US); Burn L. Lewis, Ossining, NY (US); Maria E. Smith, Plantation, FL (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/348,844

(22) Filed: Jul. 7, 1999

(51) Int. Cl.$^7$ ............................................. G01L 15/00
(52) U.S. Cl. ....................... 704/244; 704/255; 707/532
(58) Field of Search ................................ 704/243, 244, 704/251, 252, 255, 257, 270, 275; 707/530, 531, 532

(56) References Cited

U.S. PATENT DOCUMENTS

| | | | | |
|---|---|---|---|---|
| 5,231,670 A | * | 7/1993 | Goldhor et al. | 704/275 |
| 5,799,273 A | * | 8/1998 | Mitchell et al. | 704/275 |
| 6,125,347 A | * | 9/2000 | Cote et al. | 704/275 |
| 6,157,910 A | * | 12/2000 | Ortega | 704/231 |
| 6,167,377 A | * | 12/2000 | Gillick et al. | 704/240 |

* cited by examiner

Primary Examiner—Richemond Dorvil
Assistant Examiner—Martin Lerner
(74) Attorney, Agent, or Firm—Akerman Senterfitt

(57) ABSTRACT

A method for automatically analyzing a document in a speech recognition system having a vocabulary and language model can include the steps of: determining whether the document has undergone previous analysis; undoing the previous analysis; and, analyzing the document. More specifically, the determining step comprises the steps of: comparing trigrams in the document with trigrams in the language model; and, setting a reference point containing document data for undoing a previous analysis in the undoing step if the compared language model contains all the document trigrams. Moreover, the undoing step comprises the step of removing from the language model each trigram contained in the document data in the reference point. Finally, the analyzing step comprises the steps of: searching the document for new words not contained in the vocabulary; adding said new words to said vocabulary; updating the language model with trigrams contained in the document; and, setting a reference point containing document data for undoing the updating of the language model in the updating step. In addition, the adding step can comprise identifying among the new words found in the searching step, correctly-spelled words not requiring a speaker-supplied pronunciation; and adding the correctly-spelled words to the vocabulary. The inventive method can further comprise the steps of: recognizing a request from a user of the speech dictation system to discontinue user editing; finding in the document new words not contained in the vocabulary in response to the request; enhancing the vocabulary with the new words; undoing the analysis created during the analyzing step; and, further analyzing the document.

30 Claims, 5 Drawing Sheets

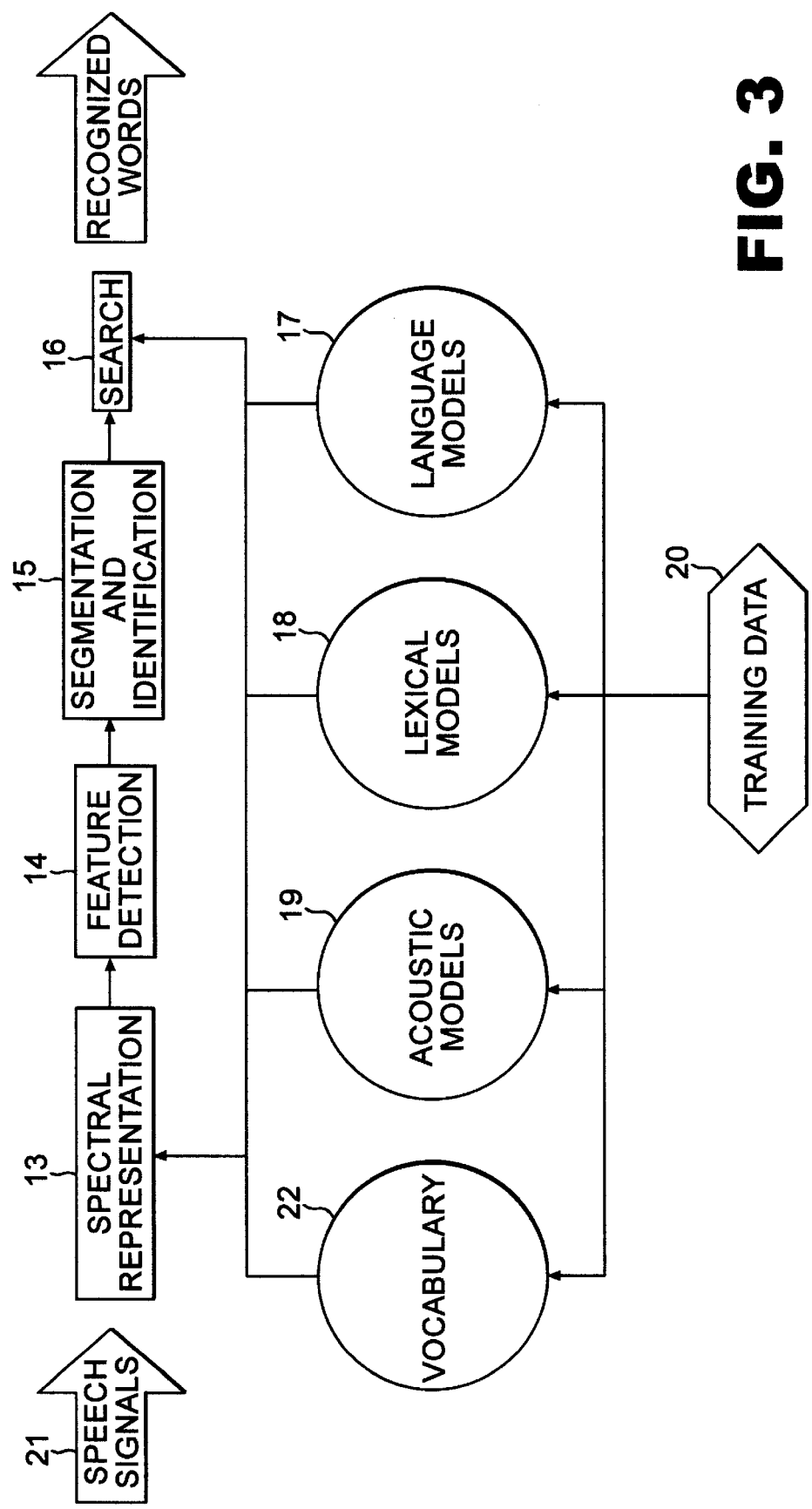

AUTOMATIC ANALYSIS OF A SPEECH DICTATED DOCUMENT

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of computer speech recognition and more particularly to a method and apparatus for automatically analyzing a speech dictated document.

2. Description of the Related Art

Speech recognition, also referred to as speech-to-text, is technology that enables a computer to transcribe spoken words into computer recognized text equivalents. Speech recognition is the process of converting an acoustic signal, captured by a transducive element, such as a microphone or a telephone, to a set of words. These words can be used for controlling computer functions, data entry, and word processing. Accomplishing accurate speech recognition is a formidable task due to the wide variety of pronunciations, individual accents and speech characteristics of individual speakers. Consequently, language models are often used to reduce the search space of possible words and to resolve ambiguities as between similar sounding words. Such language models tend to be statistically based systems and can be provided in a variety of forms.

The simplest language model can be specified as a finite state network, where the permissible words following each word are given explicitly. However, more sophisticated language language models have also been developed which are specified in terms of a context specified grammar. The most widely used statistical model of language is the trigram model. In the trigram model, a word is predicated based solely upon the two words which immediately precede it. As a result of its effectiveness and simplicity, the trigram model has been the workhorse of the statistical approach to speech recognition for over twenty years.

Since each particular speaker will tend to have their own style of speaking, it is important that the attributes of such speaking style be adapted to the language model. By continuously updating the language model, it is possible to improve the overall accuracy of the speech recognition process for that speaker and thereby permit greater efficiencies. Accordingly, it is desirable to update the language model for each particular speaker on a regular basis. One method requires the speaker to use a speech recognition correction function. However, often speakers choose not to use the correction function to correct speech recognition errors. Rather, speakers either redictate the misrecognized word or phrase, or type their own corrections directly in the document. In consequence, speech recognition systems often do not update the language model with new language model data.

Another method of updating the language model could include providing the speaker with a vocabulary expanding tool for analyzing the document. This analysis uses the document's text to update the speaker's language model and, optionally, add new words to the speaker's vocabulary. However, if the speaker executes the vocabulary expanding tool before completing the editing phase, the use of the tool will corrupt the language model with bad data. Conversely, if the speaker waits until completing the editing phase before invoking the tool, the speaker will have forgone the benefit of accuracy improvements for the duration of the editing phase. Additionally, the repeated execution of the vocabulary expanding tool on the same document will artificially bias the language model towards words contained in that document. Similarly, if the speaker repeatedly executes the vocabulary expanding tool subsequent to the dictation and editing of a single paragraph, the language model will be artificially biased towards the words contained in earlier paragraphs.

At least one existing speech application automatically analyzes speech dictated text in a document. IBM's MedSpeak®, for instance, includes an automatic analysis of speech dictated text. MedSpeak®, however, is a specialized product which only creates radiology reports. Moreover, in MedSpeak®, the automatic analysis begins only after the user completes the report—a fixed, definite event in the MedSpeak® application. In contrast, generalized speech-enabled applications, for instance a word processor, do not have a fixed, definite event denoting the completion of the editing phase of a document. In a word processing application, the speech recognition system cannot ascertain when a document has been finally edited. Moreover, by invoking automatic analysis only at the conclusion of the editing phase of a radiology report, MedSpeak® does not provide for concurrent speech recognition improvement during the editing phase of the document.

SUMMARY OF THE INVENTION

The invention concerns a method and apparatus for automatically analyzing a document in a speech dictation system. The invention as taught herein has advantages over all known methods now used to analyze a document, and provides a novel and nonobvious system, including apparatus and method, for automatically analyzing a document. A method for automatically analyzing a document in a speech dictation system having a vocabulary and language model can comprise the steps of: determining whether the document has undergone previous analysis; undoing the previous analysis; and, analyzing the document. More specifically, the determining step comprises the steps of: comparing trigrams in the document with trigrams in the language mod and, setting a reference point containing document data for undoing a previous analysis in the undoing step if the compared language model contains all the document trigrams. Moreover, the undoing step comprises the step of removing from the language model each trigram contained in the document data in the reference point. Finally, the analyzing step comprises the steps of: searching the document for new words not contained in the vocabulary; adding the new words to the vocabulary; updating the language model with trigrams contained in the document; and, setting a reference point containing document data for undoing the updating of the language model in the updating step. The adding step comprises: identifying among the new words found in the searching step, correctly-spelled words not requiring a speaker-supplied pronunciation; and, adding the correctly-spelled words to the vocabulary.

The inventive method can further comprise the steps of: recognizing a request from a user of the speech dictation system to discontinue user editing; finding in the document new words not contained in the vocabulary in response to the request; enhancing the vocabulary with the new words; undoing the analysis created during the analyzing step; and further analyzing the document. More specifically, the enhancing step comprises the steps of: procuring pronunciations for the new words in the document requiring pronunciations; and, adding the new words having procured pronunciations to the vocabulary. Alternatively, the enhancing step comprises the steps of: presenting to the user a list of the new words contained in the document accepting from the user a selection of new words from the list to be added to the vocabulary; automatically procuring pronunciations for each word contained in the selection of new words not requiring speaker-supplied pronunciations; prompting the user for pronunciations for words contained in the selection of new words requiring speaker-supplied pronunciations; and, adding the selection of new words to the vocabulary. Moreover, the presenting step comprises the steps of: creating a user list for holding the new words; including in the user list each out-of-vocabulary new word formed using all capital letters, and each capitalized new word contained in the document having a corresponding identically spelled lowercase version contained in the vocabulary; excluding from the user list each closed class new word; and, presenting the user list to the user in a user interface. Finally, the adding step comprises the steps of: discarding each selected out-of-vocabulary new word formed using all capital letters having a pronunciation procured during the prompting step which matches a pronunciation of an identically spelled lowercase version of the out-of-vocabulary new word contained in the vocabulary; and, adding each remaining selected new word to the vocabulary.

BRIEF DESCRIPTION OF THE DRAWINGS

There are presently shown in the drawings embodiments which are presently preferred, it being understood, however, that the invention is not limited to the precise arrangements and instrumentalities shown.

FIG. 3 is a block diagram showing a typical architecture for a speech recognition system configured for the inventive method.

DETAILED DESCRIPTION OF THE INVENTION.

Figure 1:
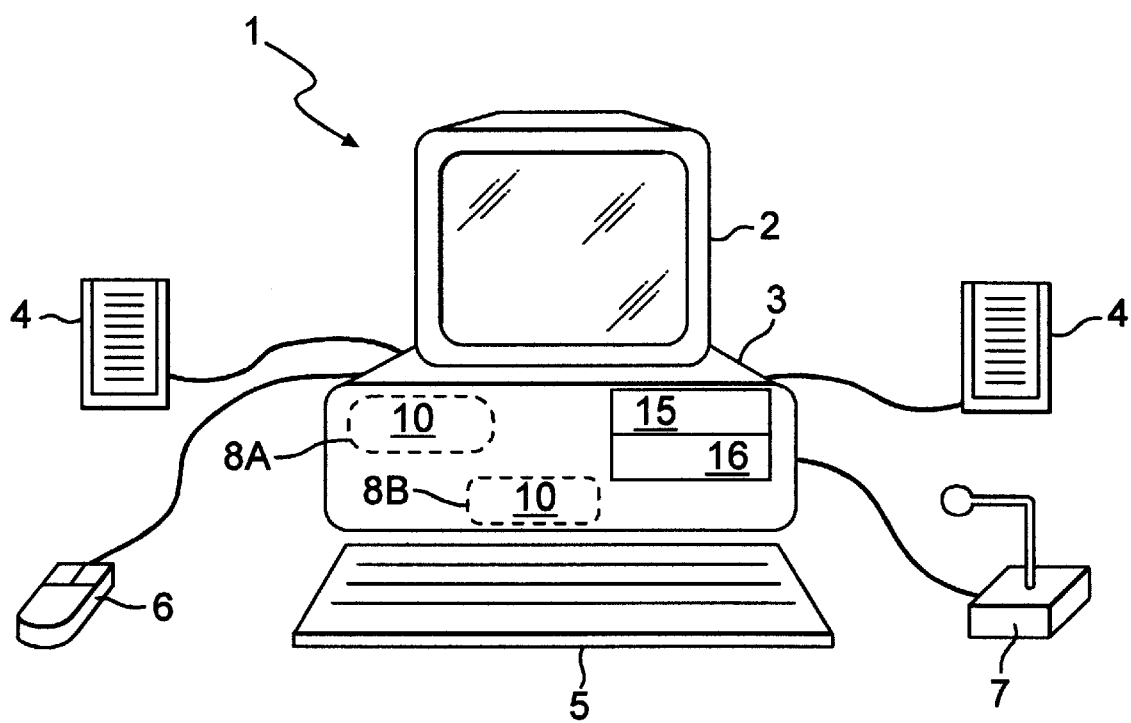
FIG. 1 is a pictorial representation of a computer system with audio capabilities on which the method of the invention can be used.

FIG. 1 shows a typical computer system 1 for use in conjunction with the present invention. The system preferably comprises of a computer 3 including a central processing unit (CPU), fixed disk 8A, internal memory device 8B, floppy disk drive 15, and CD-ROM drive 16. The system also-includes a microphone 7 operatively connected to the computer system through suitable interface circuitry or "sound board" (not shown), a keyboard 5, and at least one user interface display unit 2 such as a video data terminal (VDT) operatively connected thereto. The CPU can be comprised of any suitable microprocessor or other electronic processing unit, as is well known to those skilled in the art. An example of such a CPU would include the Pentium or Pentium II brand microprocessor available from Intel Corporation, or any similar microprocessor. Speakers 4, as well as an interface device, such as mouse 6, can also be provided with the system, but are not necessary for operation of the invention as described herein. The various hardware requirements for the computer system as described herein can generally be satisfied by any one of many commercially available high speed multimedia personal computers offered by manufacturers such as International Business Machines (IBM), Compaq, Hewlett Packard, or Apple Computers.

Figure 2:
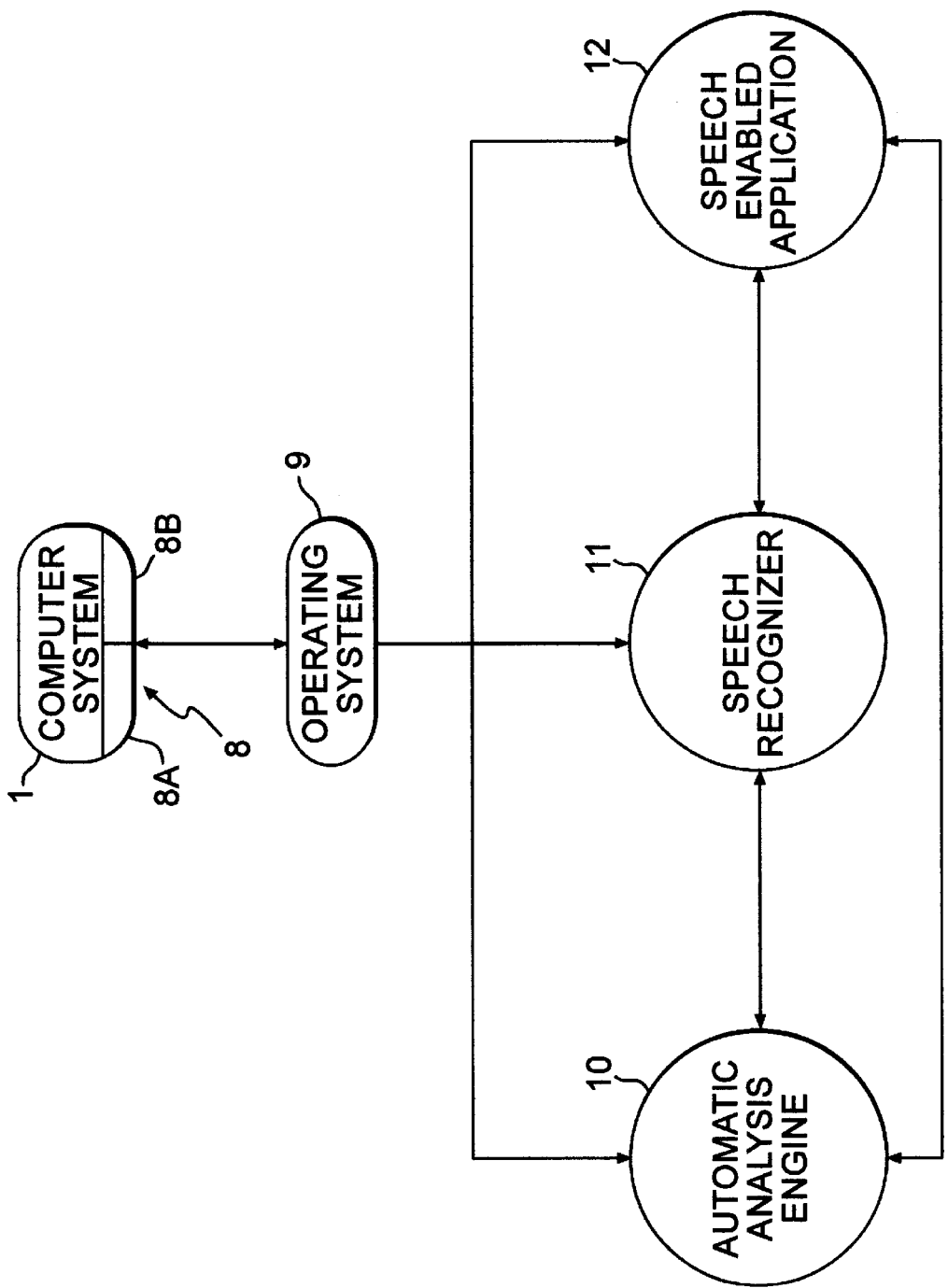
FIG. 2 is a block diagram showing a typical high level architecture for the computer system in FIG. 1.

FIG. 2 illustrates a preferred architecture for a speech dictation system in computer 1. As shown in FIG. 2, the system can include an operating system 9, an automatic analysis engine 10 in accordance with the inventive arrangements, and a speech recognizer 11. A speech enabled application 12 can also be provided. In FIG. 2, the automatic analysis engine 10, the speech recognizer 11, and the speech enabled application 12 are shown as separate application programs. It should be noted, however, that the invention is not limited in this regard, and these various applications could, of course, be implemented as a single, more complex applications program.

In a preferred embodiment which shall be discussed herein, operating system 9 is one of the Windows family of operating systems, such as Windows NT, Windows 95 or Windows 98 which are available from Microsoft Corporation of Redmond, Wash. However, the system is not limited in this regard, and the invention can also be used with any other type of computer operating system. The system as disclosed herein can be implemented by a programmer, using commercially available development tools for the operating systems described above. As shown in FIG. 2, computer system 1 includes one or more computer memory devices 8, preferably an electronic random access memory 8B and a bulk data storage medium, such as a fixed disk drive 8A.

Audio signals representative of sound received in microphone 7 are processed within computer 1 using conventional computer audio circuitry so as to be made available to operating system 9 in digitized form. The audio signals received by the computer 1 are conventionally provided to the speech recognizer 11 via the computer operating system 9 in order to perform speech recognition functions. As in conventional speech recognition systems, the audio signals are processed by the speech recognizer 11 to identify words spoken by a user into microphone 7.

FIG. 3 is a block diagram showing typical components which comprise speech recognizer 11. As shown in FIG. 3, the speech recognizer 11 receives a digitized, time-varying speech signal 21 from the operating system 9. In spectral representation block 13, a speech analysis system provides a spectral representation of the characteristics of the time-varying speech signal 21 by sampling the signal 21 at some fixed rate, typically every 10–20 msec. In block 14, the feature-detection stage converts the spectral measurements to a set of features that describe the broad acoustic properties of each, differing phonetic unit. This stage emphasizes perceptually important speaker-independent features of the speech signals 21 received from the operating system 9. In block 15, these speech signal features are segmented and identified as phonetic sequences. In this stage, algorithms process the speech signals 21 to further adapt speaker independent acoustic models to those of the current speaker according to speaker dependent training data 20. Finally, in search block 16, the speech recognizer 11 accepts these phonetic sequences and applies search algorithms to guide its search engine to the most likely words corresponding to the speech signal 21. To assist in the search process, the process in search block 16 can enlist the assistance of acoustic models 19, lexical models 18, language models 17 and vocabulary 22. One skilled in the art will recognize that, while the present invention employs trigrams in its preferred language model, other language model forms, for instance bigrams, can be substituted for the preferred language model. Subsequently, the speech recognizer 11 returns word matches and confidence values for each match which can be used to determine recognition accuracy.

Figure 4A:
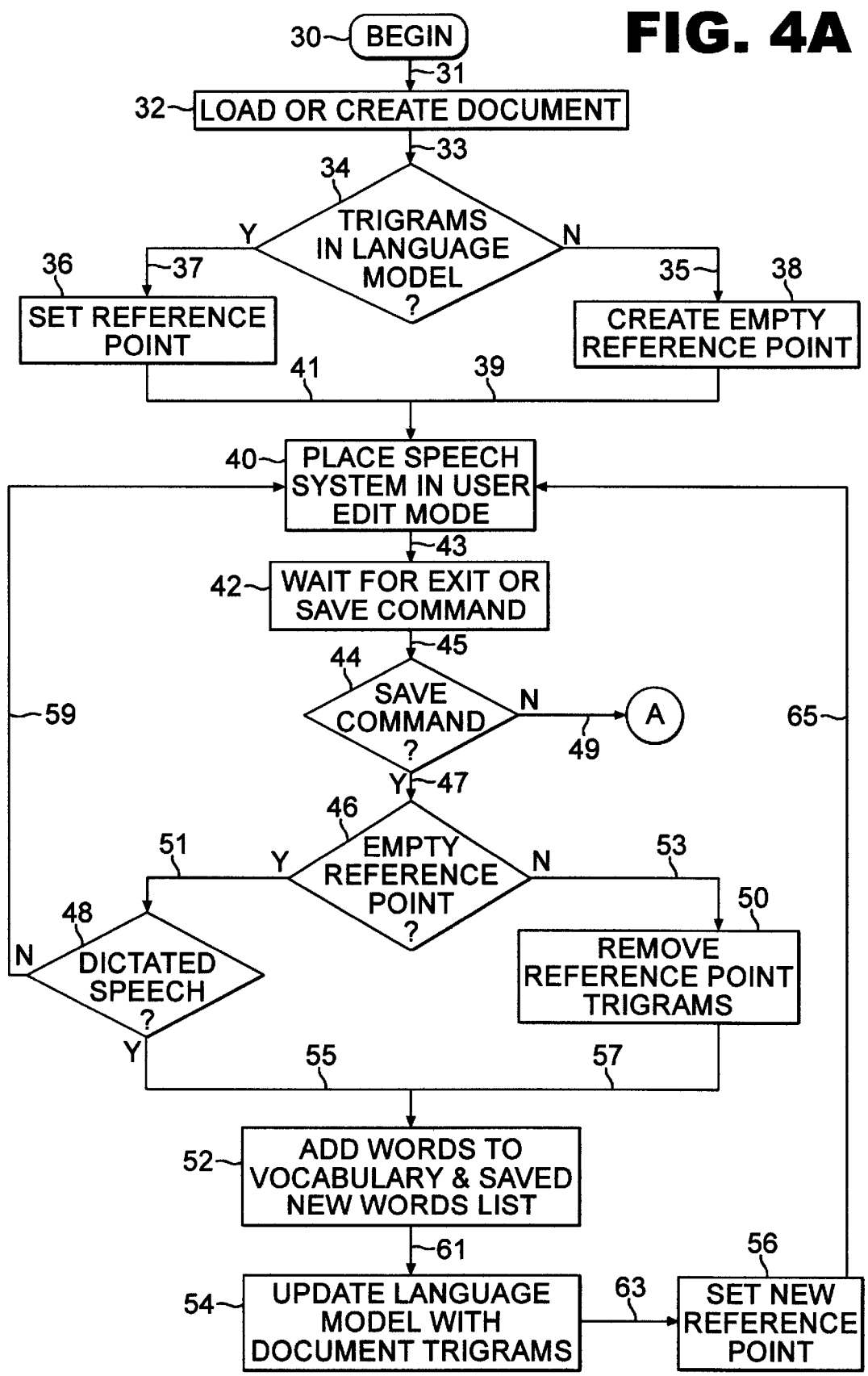
FIGS. 4A and 4B, taken together, are a flow chart illustrating the inventive method.
Figure 4B:
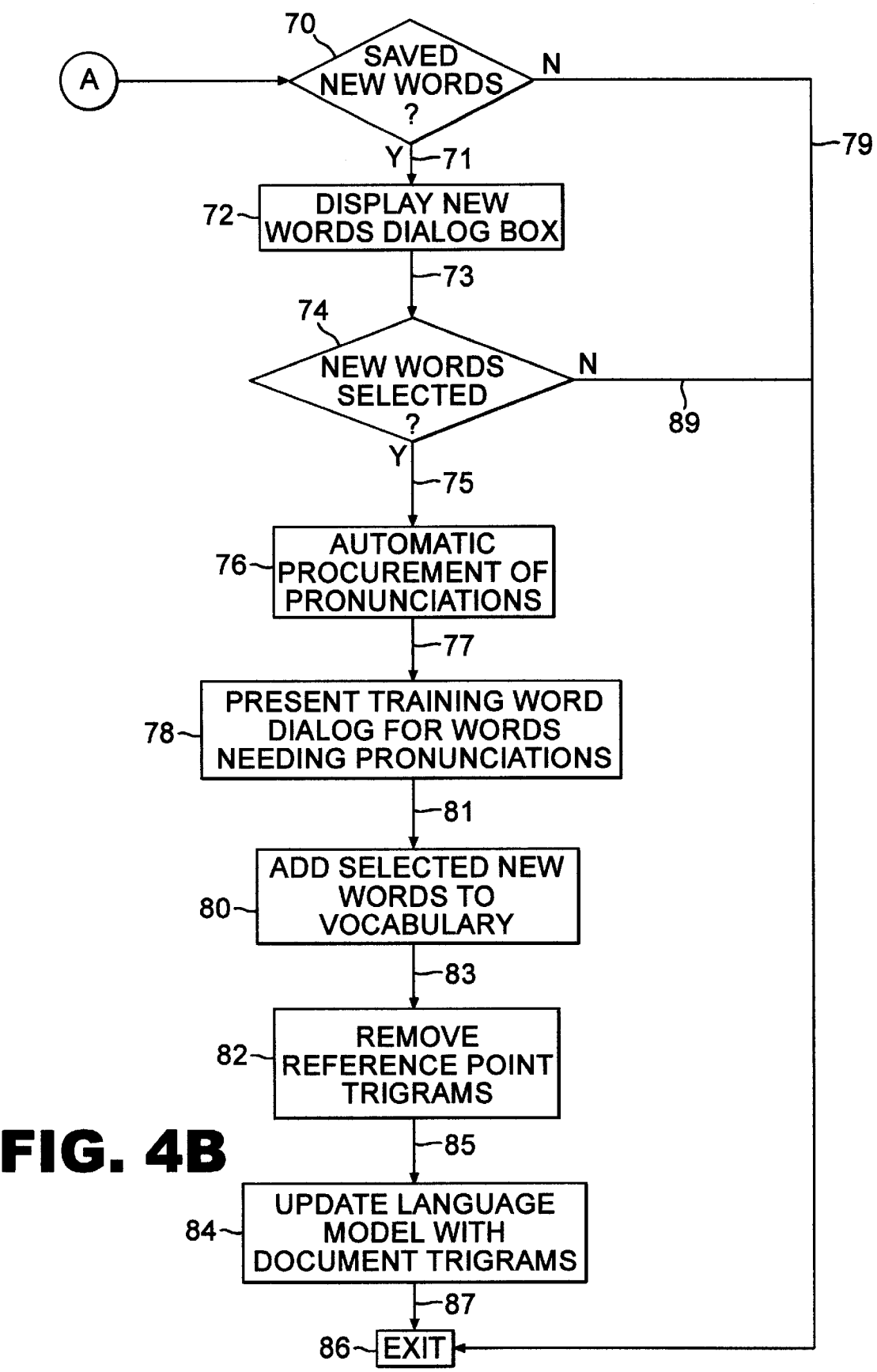

FIGS. 4A and 4B, taken together, illustrate the inventive method. In FIG. 4A, the inventive method begins in block 30. Following path 31 to block 32, the user loads an existing document or creates a new document. Following path 33 to decision block 34, it is determined whether all trigrams contained in the document are also contained in the speaker's language model. If it is determined that all trigrams contained in the document are also contained in the speaker's language model, following path 37 to block 36, a reference point is set containing the document's trigrams. Conversely, if it is determined that not all trigrams contained in the document are also contained in the speaker's language model, following path 35 to block 38, an empty reference point containing no trigrams is created. In either event, in block 40, the method preferably places the speech enabled application in a mode suitable for user dictating and editing of the document.

The inventive method can perform an automatic analysis and update in response to many recurring system events, for instance at a certain time interval, or after every tenth edit. Notwithstanding, in the preferred method, following path 43 to block 42, the method waits for an Exit or Save command before performing an automatic analysis. Subsequent to the triggering event, in decision block 44, the method determines if the event was a Save command. If the event was not a Save command, then the event is determined to have been an Exit command causing the process to continue along path 49 to jump circle A leading to decision block 70 in FIG. 4B.

In contrast, if the event is determined to have been a Save command, then in decision block 46, the method determines if the reference point is empty. If the reference point is determined empty, then it is further determined in decision block 48 whether the document contains dictated speech. If the document does not contain dictated speech, returning along path 59 to block 40, the system is returned to a user edit mode. Alternatively, if in decision block 46, it is determined that the reference point is not empty, following path 53 to block 50, each trigram appearing in the reference point is removed from the speaker's language model, before continuing along path 57 to block 52.

In block 52, the document is searched for new words not contained in the speaker's vocabulary. Furthermore, those new words known to be spelled correctly, for example if they are in the speech recognizer 11 backup dictionary, and not requiring a user-supplied pronunciation, are added to the speaker's vocabulary. New words not added are placed in a Saved New Words list, in which previously saved new words are discarded. Following path 61 to block 54, the speaker's language model is updated with the document's trigrams. In addition, following path 63 to block 56, a new reference point containing the document's trigrams is set before returning along path 65 to block 40.

Turning now to FIG. 4B, in decision block 70, it is determined whether there is a nonempty Saved New Words list updated in block 52 of FIG. 4A. If it is determined that the Saved New Words list is empty, the process terminates along path 79 to block 86. Otherwise, following path 71 to block 72, a New Words Dialog Box is displayed. One skilled in the art will recognize that a less sophisticated design could add to vocabulary 22 all new words not contained in vocabulary 22 which are included in the Saved New Words list. The less sophisticated design places the burden of the vocabulary enhancing decision making on the user. In the present method, however, certain "closed class" new words are automatically excluded from being presented to the user in the New Words Dialog Box. For instance, in the present method, closed class words defined to be "a", "an" and "the", regardless of casing, are automatically excluded. Conversely, so as to account for proper names like "Brown", "Apple" and "Ford", capitalized out-of-vocabulary words having a lowercase version in vocabulary 22 are included in the New Words Dialog Box. Similarly, acronyms having all-capitalized representations are included in the New Words Dialog Box.

In the New Words Dialog Box, the user can review each new word and choose those for addition to vocabulary 22. If, in decision block 74, no words are selected, the method terminates along the path 89 to exit block 86. Where the user has selected at least one new word for addition to vocabulary 22, following path 75 to block 76, automatic pronunciations are procured for most selected new words, using an unlimited vocabulary to create baseforms for each of the new words. Following path 77 to block 78, where pronunciations for the selected new words cannot be automatically procured, a Training Word Dialog Box can be presented to the user. Any acronyms selected in the New Words Dialog Box are presented in the Training Word Dialog Box. In block 78, using the Training Word Dialog Box, a user-provided pronunciation for the new word can be accepted. In addition, following path 81 to block 80, each selected word is added to vocabulary 22. In the case of an acronym, however, if the lowercase version of the acronym is contained in vocabulary 22, and if the user-supplied pronunciation matches the pronunciation of the lowercase version, the acronym is not added to prevent the user from accidentally adding uppercase versions of words to vocabulary 22. Only where the pronunciation of the acronym differs from the lowercase version, does the method add the word to vocabulary 22. In the case of an acronym, however, if the lowercase version of the acronym is contained in vocabulary 22, and if the user-supplied pronunciation matches the pronunciation of the lowercase version, the acronym is not added to prevent the user from accidentally adding uppercase versions of words to vocabulary 22. Only where the pronunciation of the acronym differs from the lowercase version does the method add the word to vocabulary 22.

Finally, in block 82, each trigram appearing in the reference point is removed from the speaker's language model. Furthermore, following path 85 to block 84, the speaker's language model is updated with the trigrams from the last saved version of the document. Subsequently, following path 87 to block 86, the method exits. Thus, in using the automatic analysis engine 10 in coordination with speech recognizer 11 and speech enabled application 12, the present invention can improve recognition accuracy by automatically subjecting the subject document to a vocabulary expanding inventive method. Specifically, this method can update the language model by analyzing how the user constructs each sentence. Moreover, the tool can identify new words added by the user to the document.

What is claimed is:

1. A method for automatically analyzing a document for vocabulary expansion in a speech dictation system having a vocabulary and language model comprising the steps of:

determining whether said document has undergone previous grammar analysis;

undoing said previous grammar analysis; and, performing a vocabulary expansion analysis of said document, said vocabulary expansion analysis comprising a new grammar analysis of said document.

2. The method according to claim 1, wherein said determining step comprises the steps of:
comparing trigrams in said document with trigrams in said language model; and,
setting a reference point containing document data for undoing a previous analysis in said undoing step if said compared language model contains all said document trigrams.

3. The method according to claim 2, wherein said undoing step comprises the step of removing from said language model each trigram contained in said document data in said reference point.

4. The method according to claim 1, wherein said performing step comprises the steps of:
searching said document for new words not contained in said vocabulary;
adding said new words to said vocabulary;
updating said language model with trigrams contained in said document; and,
setting a reference point containing document data for undoing said updating of said language model in said updating step.

5. The method according to claim 4, wherein said adding step comprises:
identifying among said new words found in said searching step, correctly-spelled words not requiring a speaker-supplied pronunciation; and, adding said correctly-spelled words to said vocabulary.

6. The method according to claim 1, further comprising the steps of:
recognizing a request from a user of said speech dictation system to discontinue user editing;
finding in said document new words not contained in said vocabulary in response to said request;
enhancing said vocabulary with said new words;
undoing said new grammar analysis created during said performing step; and,
performing a further vocabulary expansion analysis of said document, said further vocabulary expansion analysis comprising a further grammar analysis of said document.

7. The method according to claim 6, wherein said enhancing step comprises the steps of:
procuring pronunciations for said new words in said document requiring pronunciations; and,
adding said new words having procured pronunciations to said vocabulary.

8. The method according to claim 6, wherein said enhancing step comprises the steps of:
presenting to said user a list of said new words contained in said document;
accepting from said user a selection of new words from said list to be added to said vocabulary;
automatically procuring pronunciations for each word contained in said selection of new words not requiring speaker-supplied pronunciations;
prompting said user for pronunciations for words contained in said selection of new words requiring speaker-supplied pronunciations; and,
adding said selection of new words to said vocabulary.

9. The method according to claim 8, wherein said presenting step comprises the steps of:
creating a user list for holding said new words;
including in said user list each out-of-vocabulary new word formed using all capital letters, and each capitalized new word contained in said document having a corresponding identically spelled lowercase version contained in said vocabulary;
excluding from said user list each closed class new word; and,
presenting said user list to said user in a user interface.

10. The method according to claim 9, wherein said adding step comprises the steps of:
discarding each said selected out-of-vocabulary new word formed using all capital letters having a pronunciation procured during said prompting step which matches a pronunciation of an identically spelled lowercase version of said out-of-vocabulary new word contained in said vocabulary; and,
adding each remaining selected new word to said vocabulary.

11. A computer apparatus programmed with a routine set of instructions stored in a fixed medium, said computer apparatus comprising:
means for editing a document in a speech dictation system having a vocabulary and language model;
means for determining whether said document has undergone previous grammar analysis;
means for undoing said previous grammar analysis; and,
means for performing a vocabulary expansion analysis of said document, said vocabulary expansion analysis comprising a new grammar analysis of said document.

12. The computer apparatus according to claim 11, wherein said determining means comprises:
means for comparing trigrams in said document with trigrams in said language model; and,
means for setting a reference point containing document data for undoing a previous analysis by said undoing means if said compared language model contains all said document trigrams.

13. The computer apparatus according to claim 12, wherein said undoing means comprises means for removing from said language model each trigram contained in said document data in said reference point.

14. The computer apparatus according to claim 11, wherein said performing means comprises:
means for searching said document for new words not contained in said vocabulary;
means for adding said new words to said vocabulary;
means for updating said language model with trigrams contained in said document; and,
means for setting a reference point containing document data for undoing said updating of said language model by said updating means.

15. The computer apparatus according to claim 14, wherein said adding means comprises:
means for identifying among said new words found in by said searching means, correctly-spelled words not requiring a speaker-supplied pronunciation; and,
means for adding said correctly-spelled words to said vocabulary.

16. The computer apparatus according to claim 11, further comprising:
means for recognizing a request from a user of said speech dictation system to discontinue user editing;
means for finding in said document new words not contained in said vocabulary in response to said request;

means for enhancing said vocabulary with said new words;

means for undoing said new grammar analysis created during said performing step; and, means for performing a further vocabulary expansion analysis of said document, said further vocabulary expansion analysis comprising a further grammar analysis of said document.

17. The computer apparatus according to claim 16, wherein said enhancing means comprises:

means for procuring pronunciations for said new words in said document requiring pronunciations; and, means for adding said new words having procured pronunciations to said vocabulary.

18. The computer apparatus according to claim 16, wherein said enhancing means comprises:

means for presenting to said user a list of said new words contained in said document;

means for accepting from said user a selection of new words from said list to be added to said vocabulary;

means for automatically procuring pronunciations for each word contained in said selection of new words not requiring speaker-supplied pronunciations;

means for prompting said user for pronunciations for words contained in said selection of new words requiring speaker-supplied pronunciations; and, means for adding said selection of new words to said vocabulary.

19. The computer apparatus according to claim 18, wherein said presenting means comprises:

means for creating a user list for holding said new words;

means for including in said user list each out-of-vocabulary new word formed using all capital letters, and each capitalized new word contained in said document having a corresponding identically spelled lowercase version contained in said vocabulary;

means for excluding from said user list each closed class new word; and, means for presenting said user list to said user in a user interface.

20. The computer apparatus according to claim 19, wherein said adding means comprises:

means for discarding each said selected out-of-vocabulary new word formed using all capital letters having a pronunciation procured by said prompting means which matches a pronunciation of an identically spelled lowercase version of said out-of-vocabulary new word contained in said vocabulary; and, means for adding each remaining selected new word to said vocabulary.

21. A method for automatically analyzing a document in a speech dictation system having a vocabulary and language model comprising the steps of:

determining whether said document has undergone previous analysis;

undoing said previous analysis;

searching said document for new words not contained in said vocabulary;

identifying among said new words found in said searching step, correctly-spelled words not requiring a speaker-supplied pronunciation;

adding said correctly-spelled words to said vocabulary;

updating said language model with trigrams contained in said document; and, setting a reference point containing document data for undoing said updating of said language model in said updating step.

22. A method for automatically analyzing a document in a speech dictation system having a vocabulary and language model comprising the steps of:

determining whether said document has undergone previous analysis;

undoing said previous analysis;

analyzing said document;

recognizing a request from a user of said speech dictation system to discontinue user editing;

finding in said document new words not contained in said vocabulary in response to said request;

procuring pronunciations for said new words in said document requiring pronunciations;

adding said new words having procured pronunciations to said vocabulary;

undoing said analysis created during said analyzing step; and, further analyzing said document.

23. A method for automatically analyzing a document in a speech dictation system having a vocabulary and language model comprising the steps of:

determining whether said document has undergone previous analysis;

undoing said previous analysis;

analyzing said document;

recognizing a request from a user of said speech dictation system to discontinue user editing;

finding in said document new words not contained in said vocabulary in response to said request;

presenting to said user a list of said new word s contained in said document;

accepting from said user a selection of new words from said list to be added to said vocabulary;

automatically procuring pronunciations for each word contained in said selection of new words not requiring speaker-supplied pronunciations;

prompting said user for pronunciations for words contained in said selection of new words requiring speaker-supplied pronunciations;

adding said selection of new words to said vocabulary;

undoing said analysis created during said analyzing step; and, further analyzing said document.

24. The method according to claim 23, wherein said presenting step comprises the steps of:

creating a user list for holding said new words;

including in said user list each out-of-vocabulary new word formed using all capital letters, and each capitalized new word contained in said document having a corresponding identically spelled lowercase version contained in said vocabulary;

excluding from said user list each closed class new word; and, presenting said user list to said user in a user interface.

25. The method according to claim 24, wherein said adding step comprises the steps of:

discarding each said selected out-of-vocabulary new word formed using all capital letters having a pronunciation procured during said prompting step which matches a pronunciation of an identically spelled lowercase version of said out-of-vocabulary new word contained in said vocabulary; and, adding each remaining selected new word to said vocabulary.

26. A computer apparatus programmed with a routine set of instructions stored in a fixed medium, said computer apparatus comprising:

means for editing a document in a speech dictation system having a vocabulary, and language model;

means determining whether said document has undergone previous analysis;

means for undoing said previous analysis;

means for searching said document for new words not contained in said vocabulary;

means for identifying among said new words found in said searching step, correctly-spelled words not requiring a speaker-supplied pronunciation;

means for adding said correctly-spelled words to said vocabulary;

means for updating said language model with trigrams contained in said document; and, means for setting a reference point containing document data for undoing said updating of said language model in said updating step.

27. A computer apparatus programmed with a routine set of instructions stored in a fixed medium, said computer apparatus comprising:

means for editing a document in a speech dictation system having a vocabulary and language model;

means for determining whether said document has undergone previous analysis;

means for undoing said previous analysis;

means for analyzing said document;

means for recognizing a request from a user of said speech dictation system to discontinue user editing;

means for finding in said document new words not contained in said vocabulary in response to said request;

means for procuring pronunciations for said new words in said document requiring pronunciations;

means for adding said new words having procured pronunciations to said vocabulary;

means for undoing said analysis created during said analyzing step; and, means for further analyzing said document.

28. A computer apparatus programmed with a routine set of instructions stored in a fixed medium, said computer apparatus comprising:

means for editing a document in a speech dictation system having a vocabulary and language model;

means for determining whether said document has undergone previous analysis;

means for undoing said previous analysis;

means for analyzing said document;

means for recognizing a request from a user of said speech dictation system to discontinue user editing;

means for finding in said document new words not contained in said vocabulary in response to said request;

means for presenting to said user a list of said new words contained in said document;

means for accepting from said user a selection of new words from said list to be added to said vocabulary;

means for automatically procuring pronunciations for each word contained in said selection of new words not requiring speaker-supplied pronunciations;

means for prompting said user for pronunciations for words contained in said selection of new words requiring speaker-supplied pronunciations;

means for adding said selection of new words to said vocabulary;

means for undoing said analysis created during said analyzing step; and, means for further analyzing said document.

29. The computer apparatus according to claim 28, wherein said presenting means comprises:

means for creating a user list for holding said new words;

means for including in said user list each out-of-vocabulary new word formed using all capital letters, and each capitalized new word contained in said document having a corresponding identically spelled lowercase version contained in said vocabulary;

means for excluding from said user list each closed class new word; and, means for presenting said user list to said user in a user interface.

30. The computer apparatus according to claim 29, wherein said adding means comprises:

means for discarding each said selected out-of-vocabulary new word formed using all capital letters having a pronunciation procured during said prompting step which matches a pronunciation of an identically spelled lowercase version of said out-of-vocabulary new word contained in said vocabulary; and, means for adding each remaining selected new word to said vocabulary.

* * * * *